United States Patent [19]

Hokazono et al.

[11] Patent Number: 4,564,627

[45] Date of Patent: Jan. 14, 1986

[54] FEED COMPOSITION

[75] Inventors: Akio Hokazono, Yokohama; Tatsuyoshi Sugimoto, Hashimoto, both of Japan

[73] Assignee: Nihon Nohyaku Co., Ltd., Tokyo, Japan

[21] Appl. No.: 523,772

[22] Filed: Aug. 16, 1983

[30] Foreign Application Priority Data

Aug. 19, 1982 [JP] Japan .................. 57-142651

[51] Int. Cl.⁴ .................. A61K 31/38; A61K 31/385
[52] U.S. Cl. .................. 514/430; 514/440; 514/441
[58] Field of Search .................. 424/277

[56] References Cited

U.S. PATENT DOCUMENTS

| | | | |
|---|---|---|---|
| 3,876,663 | 4/1975 | Taninaka et al. | 424/277 |
| 4,022,907 | 5/1977 | Taninaka et al. | 424/277 |
| 4,034,102 | 7/1977 | Taninaka et al. | 424/277 |
| 4,080,466 | 3/1978 | Taninaka et al. | 424/277 |
| 4,112,089 | 9/1978 | Taninaka et al. | 424/277 |
| 4,118,506 | 10/1978 | Taninaka et al. | 424/277 |

FOREIGN PATENT DOCUMENTS

| | | | |
|---|---|---|---|
| 2448207 | 4/1975 | Fed. Rep. of Germany | 424/277 |
| 56-18576 | 4/1981 | Japan . | |
| 56-18577 | 4/1981 | Japan . | |
| 56-18578 | 4/1981 | Japan . | |
| 56-18579 | 4/1981 | Japan . | |

Primary Examiner—Frederick E. Waddell
Attorney, Agent, or Firm—Cushman, Darby & Cushman

[57] ABSTRACT

Feed compositions containing a dithia derivative represented by the general formula:

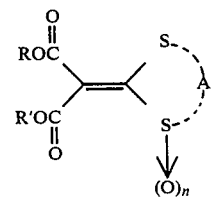

wherein R and R' are same or different lower alkyl groups, n is an integer of 0, 1 or 2, and A is —CH$_2$—.

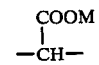

(wherein M is hydrogen or a salt-forming residue), —CH=CH—, —CH$_2$—CH$_2$—,

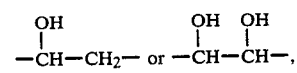

are useful for improving meat qualities of livestock, poultry and fish as well as for strengthening the eggshell of poultry.

4 Claims, No Drawings

FEED COMPOSITION

This invention relates to a feed composition containing a dithia derivative represented by the general formula [1]

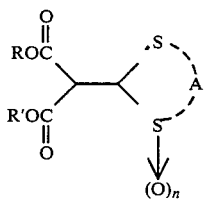

wherein R and R' are same or different lower alkyl groups, n is an integer of 0, 1 or 2, and A is —CH₂—,

(wherein M is hydrogen or a salt-forming residue such as sodium atom, potassium atom or ammonium group), —CH=CH—, —CH₂—CH₂—,

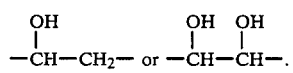

In this invention, it was made clear that, by adding the dithia derivative represented by the general formula [1] to a feed and administering the feed composition to livestock, poultry, fish, etc., fat deposit particularly abdominal fat can be reduced with the whole body weight not being reduced, namely, carcass effectiveness can be enhanced and further, in poultry such as chicken or quail, strength of eggshell can be increased.

The compounds represented by the general formula [1] are already known as a medicine for liver diseases of man and other animals, in Japanese Patent Publication Nos. 18576/1981, 18577/1981, 18578/1981 and 18579/1981 corresponding to U.S. Pat. Nos. 4,080,467, 4,080,466, 4,022,907 and 4,035,387. These compounds as medicine for liver diseases pharmacologically exhibit (1) the action of stimulating liver protein synthesis and (2) the action of suppressing liver fibrosis and have been known as a preventive or therapeutic medicine for various liver disorders such as fatty liver, liver cirrhosis, drug-induced liver diseases and congestion of liver. Their effects as preventive or therapeutic medicine have been regarded as reducing the fat in liver by transferring to other organs.

The present inventors paid attention on the pharmacological actions of the compounds represented by the general formula [1] and investigated their actions for liver and other actions by adding these compounds to feeds and administering the resulting feeds to livestock, poultry, fish, etc. As a result, surprisingly, unexpected new effects such as reduction of abdominal fat and, in laying hens, improvement of eggshell strength (improvement of eggshell quality) were found out. By utilizing these findings, this invention has been attained.

In the current livestock breeding, in order to enhance livestock productivity, they are confined in small sections, given excess feeds and yet not allowed to do sufficient physical exercises. Consequently, they accumulate excess fat at abdominal cavity. In the market, such livestock are traded at low prices, or not traded as objects for meat resulting in lower carcass effectiveness. Further, in dismemberment of edible chickens, excess fat reduces the operating efficiency of dismemberment equipments causing a big problem.

In the present invention, application of the above mentioned new findings to the above problems of the current livestock breeding was thought of and very significant effects were obtained. That is, by adding an appropriate quantity of a dithia derivative represented by the general formula [1] to a feed, abdominal fat of livestock could be reduced (instead, content of body protein could be increased) without decrease off body weight gain. This brought about meaningful effects such as improvement of meat quality and carcass effectiveness. Further, in laying hens, eggshell was clearly strengthened, whereby it has become possible to greatly decrease the current rate of egg breakage of 10% (total average in egg distribution in Japan from producers to consumers) and to substantially reduce the problem of egg breakage during distribution.

Examples of the compounds represented by the general formula [1] according to this invention and their toxicities are shown below.

| Compound No. | A | n | R | R₁ | Melting point | LD₅₀ mouse ♂ |
|---|---|---|---|---|---|---|
| 1 | —CH₂— | 0 | i-C₃H₇ | i-C₃H₇ | m.p. 104~105° C. | >5,000 mg/kg |
| 2 | —CH₂— | 0 | C₂H₅ | i-C₃H₇ | m.p. 37~39° C. | >5,000 mg/kg |
| 3 | —CH(COOH)— | 0 | i-C₃H₇ | i-C₃H₇ | m.p. 170~171° C. | >5,000 mg/kg |
| 4 | —CH=CH— | 0 | i-C₃H₇ | i-C₃H₇ | m.p. 55~57° C. | 3,120 kg/mg |
| 5 | —CH=CH— | 0 | C₂H₅ | C₂H₅ | m.p. 113° C. | 4,900 mg/kg |
| 6 | —CH₂—CH— | 0 | i-C₃H₇ | i-C₃H₇ | m.p. 54.5~55° C. | 1,350 mg/kg |
| 7 | —CH₂—CH₂— | 1 | i-C₃H₇ | i-C₃H₇ | m.p. 78~83° C. | >6,000 mg/kg |
| 8 | —CH₂—CH(OH)— | 0 | i-C₃H₇ | i-C₃H₇ | m.p. 73~74° C. | >6,590 mg/kg |
| 9 | —CH(OH)—CH(OH)— | 0 | i-C₃H₇ | i-C₃H₇ | m.p. 132.6° C. | |

These compounds have very low toxicities toward warm-blooded animals and, as seen in the above table, belong to ordinary substances in poison and violet poison control acts, and do not show intoxicating actions toward administered animals in the concentration in feed of 10 to 2000 ppm which is the range specified in this invention.

The meritorious effects of this invention can be obtained by adding a compound represented by the general formula [1] to the feed of an object animal so that the compound concentration in the feed is 10 to 2000 ppm, desirably 50 to 1000 ppm, mixing them uniformly to make a feed composition and administering the composition every day. The content of the feed differs slightly depending on the object animal but the effects of this invention is not affected by the difference in the kind of feed. Object animals of this invention are chickens, quails, cattle, swine, yellowtails, carps and so forth.

Feeds to which a dithia derivative is added as well as their application styles are various and differ depending on kind of animals to be bred or cultivated such as livestock, poultry and fish, environment and condition of breeding or cultivation, taste and each animal, method of feeding, sex, age, and so forth. Examples of feeds and feed application styles are as follows.

As feeds for porker, corn, milo, barley, bran, defatted rice bran, molasses, fish meal, soybean cake, skim powder milk, alfalfa meal, yeasts, safflower meal, calcium carbonate, calcium phosphate, table salt, vitamin additives, mineral additives, etc. can be optionally blended so as to meet application purposes. These blended feeds can be used in the form of mash, in many cases.

As feeds for cattle, particularly beef cattle, corn, milo, rains such as barley, bran, such as defatted rice bran, soybean cake, vegetable oil cake such as linseed meal, molasses, table salt, calcium carbonate, calcium phosphate, vitamins, micromineral matters, etc. can be optionally blended so as to meet application purposes. In many cases, these blended feeds can be used in the form of mash.

As feeds for chicken breeding, there are various feeds such as feeds for broiler breeding and feeds for laying hen breeding (chick breeding and hen breeding). They differ slightly from each other but are produced by optionally blending materials and slight quantities of additives shown below, so as to meet application purposes. Corn, milo, fish meal, fish extract soluble, safflower meal, corn gluten feed, soybean cake, sesame cake, defatted rice bran, bran, alfalfa meal, yeasts, industrial products from fermentation, molasses, calcium compounds, phosphoric acid, choline, pantothenic acid, folic acid, manganese, zinc, salts, table salt, vitamin preparations, minerals, synthetic amino acids, coloring agents for yolk, antibiotics, antioxidants, preventives for various diseases, etc. These blended feeds can be used in the form of mash, in many cases.

As for fish breeding, animal materials such as white fish meal, blood meal, liver powder, skim powder milk and defatted chrysalis meal; vegetable materials such as wheat flour, soybean cake, gluten meal, yeasts, alfalfa meal, pregelatinized starch and wheat active gluten; and so forth can be optionally blended so as to meet application purposes. These blended feeds can be used in the formof grains such as pellet and granule.

As materials and slight quantities of additives to be used in feeds for livestock, poultry, fish, etc., those other than mentioned above can be blended depending upon application purposes or can be used alone.

Application styles are not restricted only to mash, pellet and granule and other styles can be appropriately used depending upon application purposes.

Examples and test examples will be explained below.

EXAMPLE 1

Feed for Hens

A feed for hens can be produced by adding 0.05 parts by weight of the compound No. 4 to 100 parts by weight of "New Leghorn Hit" (manufactured by Nisshin Seifun K.K.) and mixing them uniformly.

EXAMPLE 2

Feed for Broilers

A feed for broiler chicks can be produced by adding 0.05 parts by weight of the compound No. 6 to 100 parts by weight of "Starter" for broilers (manufactured by Nihon Shiryo K.K.) and mixing them uniformly.

The compound represented by the general formula [1] can be added as a component of blended feeds as in above or can be mixed with a single component feed.

TEST EXAMPLE 1

To each group consisting of 30 "A A Fuji" broilers (15 male, 15 female), a commercially available early period broiler feed (crumble form, Cp 22%, ME 3,030 kcal/kg) was given from beginning of feeding to 4 week age, and a latter period broiler feed (mash form, Cp 18%, ME 3,030 kcal/kg) was given ad libitum from 4 week age to 10 week age. The test period was from Oct. 10, 1981 through Dec. 20, 1981. Addition of test compounds to the above feeds in predetermined concentrations was conducted from 3 week age through the completion of the test.

STUDY ITEMS AND TEST METHODS (1) Growth of body weight

Body weight was measured at beginning of feeding and every other week after 3 week age. All broilers were measured and an average body weight was calculated for each group.

(2) Feed consumption

Feed consumption was calculated by weighing feeds left at the time of body weight measurement, and therefrom feed conversion ratio was calculated.

(3) Fat deposit

Five broilers at 6 week age, five broilers at 8 week age and ten broilers at 10 week age were taken out from each group and slaughtered. Immediately after slaughtering, they were cooled in water for about 2 hr and the body weight of each slaughtered broiler was measured and subsequently they were stored at 2° C. for about 20 hr. Then, in order to measure abdominal fat, mesentary fat was removed and fat adhered to from gizzard to proventriculus was collected and weighed as the weight of abdominal fat. This weight was divided by body weight to obtain abdominal fat deposit per 100 g of body weight. Further, liver fat was also collected and weighed. A liver under freeze storage was cut into slices in a total quantity of 2 to 3 g. The slices were placed in a cylindrical filter paper and weighed. Then, these slices were dried for 3 hr in a hot air drier kept at 90° C. and subsequently extracted for 17 hr with ethyl ether in a Soxhlet fat extractor. After drying the extract for 3 hr at 60° C. and weighing the residue, crude fat content in liver was calculated.

Results (1) Growth of body weight

TABLE 1

| Tested compound | Compound concentration in feed. ppm | Body weight (g) at each week age | | | | | | | | |
|---|---|---|---|---|---|---|---|---|---|---|
| | | 0 | 3 | 4 | 5 | 6 | 7 | 8 | 9 | 10 |
| Not added | 0 | 41 | 622 | 976 | 1,322 | 1,674 | 2,080 | 2,485 | 2,862 | 3,122 |
| Compound No. 4 | 200 | 41 | 620 | 981 | 1,341 | 1,661 | 2,090 | 2,502 | 2,860 | 3,105 |
| Compound No. 4 | 400 | 41 | 626 | 985 | 1,346 | 1,667 | 2,102 | 2,512 | 2,874 | 3,115 |
| Compound No. 4 | 800 | 41 | 625 | 984 | 1,330 | 1,662 | 2,065 | 2,496 | 2,871 | 3,098 |
| Compound No. 4 | 2,400 | 41 | 621 | 974 | 1,316 | 1,640 | 2,003 | 2,388 | 2,796 | 2,984 |
| Compound No. 6 | 100 | 41 | 628 | 978 | 1,326 | 1,672 | 2,602 | 2,492 | 2,880 | 3,107 |
| Compound No. 6 | 200 | 41 | 623 | 983 | 1,340 | 1,662 | 2,108 | 2,487 | 2,873 | 3,112 |
| Compound No. 6 | 400 | 41 | 624 | 984 | 1,338 | 1,652 | 2,112 | 2,505 | 2,865 | 3,086 |
| Compound No. 6 | 800 | 41 | 622 | 981 | 1,332 | 1,657 | 2,063 | 2,501 | 2,858 | 3,024 |
| Compound No. 6 | 1,600 | 41 | 624 | 980 | 1,328 | 1,663 | 2,102 | 2,483 | 2,864 | 3,033 |

As seen in the above table, when broilers were bred with feeds containing compounds of this invention, growth of their body weights was not influenced except that the growth of the test group fed with feeds containing 2,400 ppm of the compound No. 4 was badly affected.

(2) Feed consumption

There was significant reduction of feed consumption only in the test group fed with feeds containing 2,400 ppm of the compound No. 4. The lower growth of body weight of the same test is presumed to be due to this reduction in feed consumption.

(3) Fat deposit

TABLE 2

| Test compound | Compound concentration in feed, ppm | Abdominal fat deposit, g/100 g | | | Crude fat content in liver, % | | |
|---|---|---|---|---|---|---|---|
| | | 6w | 8w | 10w | 6w | 8w | 10w |
| Not added | 0 | 3.34 | 3.95 | 4.43 | 2.30 | 5.86 | 5.45 |
| Compound No. 4 | 200 | 3.20 | 3.55 | 3.83 | 2.20 | 5.23 | 4.47 |
| Compound No. 4 | 400 | 3.02 | 3.18 | 3.78 | 2.06 | 5.02 | 4.29 |
| Compound No. 4 | 800 | 2.93 | 3.22 | 3.37 | 2.17 | 4.62 | 4.25 |
| Compound No. 4 | 2,400 | 2.92 | 3.15 | 3.22 | 2.11 | 4.04 | 3.96 |
| Compound No. 6 | 100 | 3.23 | 3.72 | 4.18 | 2.23 | 5.51 | 5.09 |
| Compound No. 6 | 200 | 3.24 | 3.64 | 4.03 | 2.03 | 4.97 | 4.33 |
| Compound No. 6 | 400 | 3.08 | 3.38 | 3.97 | 2.15 | 4.53 | 4.26 |
| Compound No. 6 | 800 | 3.14 | 3.35 | 3.85 | 2.14 | 4.26 | 4.33 |
| Compound No. 6 | 1,600 | 3.04 | 3.32 | 3.78 | 2.08 | 4.32 | 4.32 |

As seen in the above table, abdominal fat and crude fat content in liver were lower with significance in all test groups fed with feeds containing compounds of this invention.

Thus, in this test example, body weights of all test groups fed with compound-added feeds increased similarly to those of the control group fed with non-added feeds. In the meantime, abdominal fat deposits of the test groups were less than that of the control group and thereby meat quality and carcass effectiveness of the test groups could be improved.

TEST EXAMPLE 2

Test Method

As test hens, commercially available laying hens of 480 day age were used. The control group fed with a feed not containing any compound of this invention consisted of 100 laying hens, and each test group fed with a feed containing a compound of this invention consisted of 10 laying hens. The test was repeated twice. The test period was 16 weeks from Nov. 17, 1981 to Mar. 8, 1982. The first 4 weeks from the start was a preliminary observation period, during which each group was controlled so as to give the same egg production rate. As the feed, a commercially available feed for laying hens (Cp 16% or above, ME 2,800 kcal/kg or above) was used. From the 5th week, predetermined quantities of test compounds were uniformly added to this feed and the resulting blended feeds were given to test groups. Feeds and water were given ad libitum. Constant lighting was made for 14 hr a day. Egg production rate was daily recorded for each individual hen and egg weight for each test group. Feed intake quantity was obtained by calculating on every other week a difference between quantity fed and quantity left. For examining egg quality, strength of eggshell and thickness of eggshell were measured for all normal eggs laid during a period of the previous day of measurement to 3 P.M. of the measurement day. Strength of eggshell was measured by a FHK eggshell strength tester model FN-597, and thickness of eggshell by a dial thickness gauge.

Result

TABLE 3

| Test compound | Compound concentration in feed, ppm | Day age | | | | | |
|---|---|---|---|---|---|---|---|
| | | 509th day | | 555th day | | 612th day | |
| | | Thickness, (mm) | Strength (kg) | Thickness, (mm) | Strength (kg) | Thickness, (mm) | Strength (kg) |
| Not added | 0 | 0.330 | 2.42 | 0.343 | 2.62 | 0.346 | 2.70 |
| Compound No. 4 | 100 | 0.345 | 2.47 | 0.343 | 2.88 | 0.342 | 2.97 |
| Compound No. 4 | 500 | 0.342 | 2.46 | 0.350 | 2.93 | 0.345 | 3.02 |
| Compound No. 4 | 2,500 | 0.336 | 2.44 | 0.347 | 2.97 | 0.344 | 3.08 |
| Compound No. 6 | 5 | 0.328 | 2.40 | 0.341 | 2.75 | 0.344 | 2.74 |
| Compound No. 6 | 25 | 0.345 | 2.47 | 0.345 | 2.88 | 0.341 | 2.99 |
| Compound No. 6 | 125 | 0.343 | 2.39 | 0.340 | 2.95 | 0.342 | 3.11 |
| Compound No. 6 | 625 | 0.325 | 2.42 | 0.346 | 3.01 | 0.348 | 3.07 |

With respect to egg production rate and egg weight, there were no particular differences between control group and test groups and accordingly no statistically significant differences were observed.

With respect to feed intake, a lower value was seen with significance only in the test group fed with the feed containing 2,500 ppm of the compound No. 4.

With respect to growth of body weight, there was no difference between control group and test groups excluding the test group fed with the feed containing 2,500 ppm of the compound No. 4.

What is claimed is:

1. A method for enhancing the carcass utility effectiveness of livestock, poultry and fish by feeding a feed composition containing a carcass utility effectiveness enhancing amount of a dithia derivative represented by the formula:

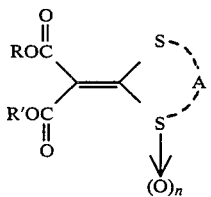

wherein R and R' are same or different lower alkyl groups, n is an integer of 0, 1 or 2, and A is —CH$_2$—,

(wherein M is hydrogen or a salt-forming residue), —CH=CH—, —CH$_2$—CH$_2$—, $$-\underset{\underset{\text{OH}}{|}}{\text{CH}}-\text{CH}_2- \text{ or } -\underset{\underset{\text{OH}}{|}}{\text{CH}}-\underset{\underset{\text{OH}}{|}}{\text{CH}}-.$$

2. A method for improving eggshell strength of poultry by feeding a feed composition containing an eggshell strengthening amount of a dithia derivative represented by the formula:

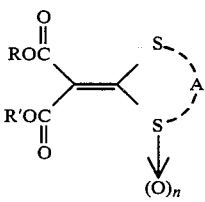

wherein R and R' are same or different lower alkyl groups, n is an integer of 0, 1 or 2, and A is —CH$_2$—,

(wherein M is hydrogen or a salt-forming residue), —CH=CH—, —CH$_2$—CH$_2$—,

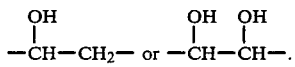

3. A method according to claim 1, wherein the content of the compound represented by the formula in the feed composition is 50 to 1000 ppm.

4. A method according to claim 2, wherein the content of the compound represented by the formula in the feed composition is 50 to 1000 ppm.

* * * * *